United States Patent
Jalalmaab et al.

(10) Patent No.: US 11,989,902 B2
(45) Date of Patent: May 21, 2024

(54) VEHICULAR TRAILERING ASSIST SYSTEM WITH TRAILER BEAM LENGTH ESTIMATION

(71) Applicant: Magna Electronics Inc., Auburn Hills, MI (US)

(72) Inventors: Mohammadmehdi Jalalmaab, Waterloo (CA); Jyothi P. Gali, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 112 days.

(21) Appl. No.: 17/643,596

(22) Filed: Dec. 10, 2021

(65) Prior Publication Data

US 2022/0189052 A1 Jun. 16, 2022

Related U.S. Application Data

(60) Provisional application No. 63/199,155, filed on Dec. 10, 2020.

(51) Int. Cl.
| | |
|---|---|
| *G06T 7/60* | (2017.01) |
| *B60D 1/36* | (2006.01) |
| *G06T 7/20* | (2017.01) |
| *G06T 7/70* | (2017.01) |
| *H04N 23/80* | (2023.01) |

(52) U.S. Cl.
CPC ............ *G06T 7/60* (2013.01); *G06T 7/20* (2013.01); *G06T 7/70* (2017.01); *H04N 23/80* (2023.01); *B60D 1/36* (2013.01); *G06T 2207/30252* (2013.01)

(58) Field of Classification Search
CPC .... G06T 7/60; G06T 7/70; G06T 7/20; G06T 2207/30252; H04N 23/80; B60D 1/36
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,576,687 A | 11/1996 | Blank et al. |
| 5,632,092 A | 5/1997 | Blank et al. |
| 5,668,663 A | 9/1997 | Varaprasad et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |

(Continued)

*Primary Examiner* — On S Mung
(74) *Attorney, Agent, or Firm* — HONIGMAN LLP (57) ABSTRACT

A vehicular trailer beam estimation system includes a camera disposed at a rear portion of a vehicle equipped with a trailer hitch. With a trailer hitched at the trailer hitch of the vehicle, the camera views at least a portion of the trailer hitched to the vehicle. The system, responsive at least in part to processing by an image processor of image data captured by the camera, determines a trailer angle of the trailer relative to the vehicle. During a driving maneuver, the system tracks trailering parameters, which include (i) the trailer angle, (ii) steering angle of the vehicle and (iii) speed of the vehicle. The system determines beam length of the trailer based at least in part on (i) the trailering parameters, (ii) the vehicle's wheelbase and (iii) hitch length of the trailer hitch of the vehicle.

22 Claims, 5 Drawing Sheets

(56) References Cited

U.S. PATENT DOCUMENTS

| | | |
|---|---|---|
| 5,802,727 A | 9/1998 | Blank et al. |
| 5,878,370 A | 3/1999 | Olson |
| 6,087,953 A | 7/2000 | DeLine et al. |
| 6,173,501 B1 | 1/2001 | Blank et al. |
| 6,222,460 B1 | 4/2001 | DeLine et al. |
| 6,329,925 B1 | 12/2001 | Skiver et al. |
| 6,513,252 B1 | 2/2003 | Schierbeek et al. |
| 6,642,851 B2 | 11/2003 | Deline et al. |
| 6,690,268 B2 | 2/2004 | Schofield et al. |
| 7,004,593 B2 | 2/2006 | Weller et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 9,085,261 B2 | 7/2015 | Lu et al. |
| 9,446,713 B2 | 9/2016 | Lu et al. |
| 9,558,409 B2 | 1/2017 | Pliefke et al. |
| 9,937,953 B2 | 4/2018 | Lavoie et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 10,780,752 B1 | 9/2020 | Niewiadomski et al. |
| 2006/0050018 A1 | 3/2006 | Hutzel et al. |
| 2006/0061008 A1 | 3/2006 | Karner et al. |
| 2008/0231701 A1* | 9/2008 | Greenwood .......... G06T 7/0008 348/148 |
| 2012/0162427 A1 | 6/2012 | Lynam |
| 2014/0022390 A1 | 1/2014 | Blank et al. |
| 2014/0085472 A1 | 3/2014 | Lu et al. |
| 2014/0160276 A1 | 6/2014 | Pliefke et al. |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0174128 A1 | 6/2017 | Hu et al. |
| 2017/0217372 A1 | 8/2017 | Lu et al. |
| 2017/0254873 A1 | 9/2017 | Koravadi |
| 2017/0341583 A1 | 11/2017 | Zhang et al. |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0092388 A1* | 3/2019 | Raad .................... B62D 13/06 |
| 2019/0118860 A1 | 4/2019 | Gali et al. |
| 2019/0143895 A1 | 5/2019 | Pliefke et al. |
| 2019/0297233 A1 | 9/2019 | Gali et al. |
| 2019/0347825 A1 | 11/2019 | Gupta et al. |
| 2019/0359134 A1 | 11/2019 | Yamamoto et al. |
| 2020/0017143 A1 | 1/2020 | Gali |
| 2020/0282910 A1 | 9/2020 | Nagasamy |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0027490 A1 | 1/2021 | Taiana et al. |
| 2021/0078634 A1 | 3/2021 | Jalalmaab et al. |
| 2021/0127693 A1 | 5/2021 | Tomita et al. |
| 2021/0170820 A1 | 6/2021 | Zhang |
| 2021/0170947 A1 | 6/2021 | Yunus et al. |
| 2022/0024391 A1 | 1/2022 | Gali et al. |
| 2022/0027644 A1 | 1/2022 | Gali et al. |
| 2022/0028111 A1 | 1/2022 | Gali et al. |

\* cited by examiner

VEHICULAR TRAILERING ASSIST SYSTEM WITH TRAILER BEAM LENGTH ESTIMATION

CROSS REFERENCE TO RELATED APPLICATION

The present application claims the filing benefits of U.S. provisional application Ser. No. 63/199,155, filed Dec. 10, 2020, which is hereby incorporated herein by reference in its entirety.

FIELD OF THE INVENTION

The present invention relates generally to a vehicle and trailer guidance system for guiding a vehicle and trailer during a driving maneuver.

BACKGROUND OF THE INVENTION

Use of imaging sensors to help a driver when backing up a trailer is common and known. Examples of such known systems are described in U.S. Pat. Nos. 9,446,713 and 9,085,261, which are hereby incorporated herein by reference in their entireties.

SUMMARY OF THE INVENTION

Implementations herein provide vehicular trailer beam estimation system that includes a camera disposed at a rear portion of a vehicle equipped with the vehicular trailer beam estimation system. The camera includes a CMOS imaging array. The CMOS imaging array includes at least one million photosensors arranged in rows and columns. The camera views at least rearward of the vehicle and captures image data. The vehicle is equipped with a trailer hitch and, with a trailer hitched at the trailer hitch of the vehicle, the camera views at least a portion of the trailer hitched at the trailer hitch of the vehicle. The system includes an electronic control unit (ECU) that includes electronic circuitry and associated software. The electronic circuitry includes an image processor operable to process image data captured by the camera. The vehicular trailer beam estimation system, responsive at least in part to processing by the image processor of image data captured by the camera, determines a trailer angle that includes an angle between a longitudinal axis of the trailer and a longitudinal axis of the vehicle. During a driving maneuver of the vehicle, the vehicular trailer beam estimation system tracks trailering parameters including at least (i) the determined trailer angle, (ii) steering angle of the vehicle and (iii) speed of the vehicle. The vehicular trailer beam estimation system determines beam length of the trailer based at least in part on (i) the trailering parameters tracked during the driving maneuver, (ii) the vehicle's wheelbase and (iii) hitch length of the trailer hitch of the vehicle. The hitch length includes distance along the longitudinal axis of the vehicle from a rear axle of the vehicle to a hitch ball of the trailer hitch of the vehicle.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a vehicle 10 includes a trailering assist system or trailer maneuvering or guidance system 12 that is operable to guide the vehicle during backing up or reversing of the vehicle with a hitched trailer 16. The trailer 16 is hitched at the vehicle via, for example, a hitch 14 (such as via a trailer coupler at the end of the trailer tongue hitching to the hitch ball of the hitch of the vehicle to establish a pivoting joint connection of the trailer to the vehicle). The trailer guidance system 12 may guide and maneuver the vehicle 10 and trailer 16 toward a desired or selected location.

Figure 1:
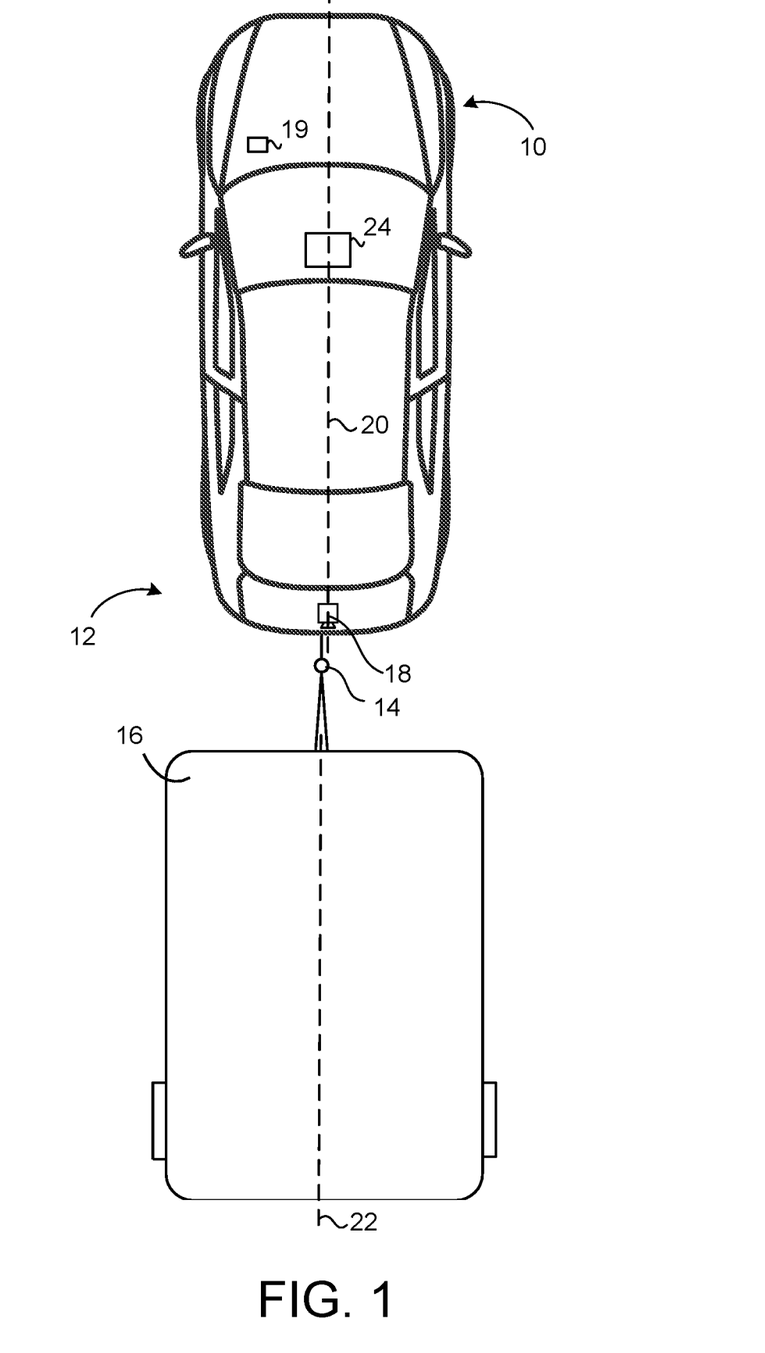
FIG. 1 is a plan view of a vehicle and a trailer, the vehicle equipped with a trailer guidance system that is operable to maneuver the vehicle and steer the trailer along a trailer direction.

In the illustrated embodiment, the trailer guidance system 12 includes at least one exterior viewing vehicle-based imaging sensor or camera, such as a rearward viewing imaging sensor or camera or rear backup camera 18 (and the system may optionally include multiple exterior viewing imaging sensors or cameras, such as a sideward/rearward viewing camera at respective sides of the vehicle and/or trailer), which captures image data representative of the scene exterior and rearward of the vehicle 10 (FIG. 1). The field of view of the rear backup camera 18 includes the hitch 14 and/or trailer 16. The rear backup camera 18 includes a lens for focusing images at or onto an imaging array or imaging plane or imager of the camera. The trailer maneuver guidance system 12 includes a control or electronic control unit (ECU) or processor 19 that includes electronic circuitry, such as an image and/or data processor, and associated software. The ECU 19 is operable to process image data captured by the camera or cameras and the system 12 may, based on processing of the captured image data at the processor of the ECU 19, detect objects or the like and/or provide displayed images at a display device 24 for viewing by the driver of the vehicle 10. The control 19 and/or display device 24 may be part of or incorporated in or at an interior rearview mirror assembly of the vehicle 10, or the control 19 and/or the display device 24 may be disposed elsewhere at or in the vehicle 10. The trailer guidance system 12 may determine a current angle between a centerline axis 20 of the vehicle and a centerline axis 22 of the trailer 16 such as by processing the image data captured by the rearward viewing camera 18 and/or a bed camera and/or one or more side cameras (i.e., the trailer angle). The data transfer or signal communication from the camera to the ECU 19 may comprise any suitable data or communication link, such as a vehicle network bus or the like of the equipped vehicle.

Figure 2:
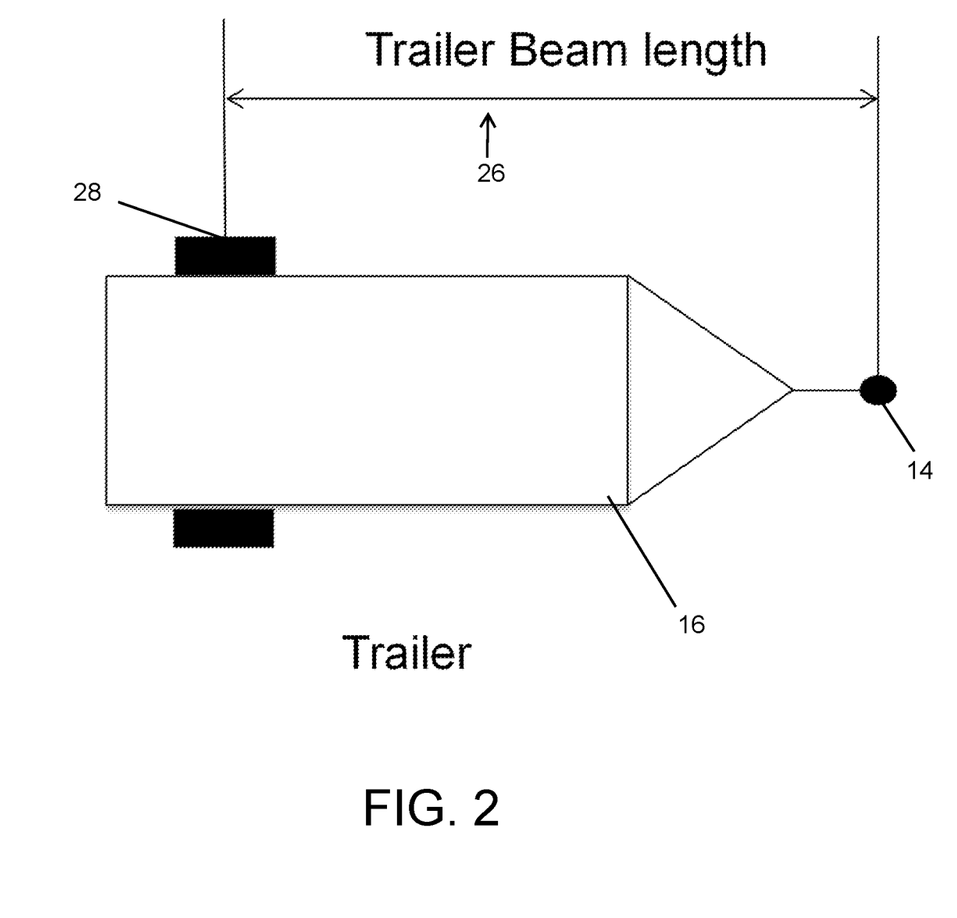
FIG. 2 is a schematic view of a trailer and the trailer beam length.

Referring now to FIG. 2, the system 12 includes aspects for estimating a beam length 26 of the trailer 16 (i.e., a trailer beam length or length/distance between the hitch or coupler 14 and the axle or the center between two or three axles of the trailer) during a driving maneuver or a towing maneuver of the vehicle. In other words, a towing vehicle (i.e., a vehicle with a trailer hitched to the towing vehicle) may be equipped with the trailer guidance system 12 and the system 12 may determine the beam length 26 of the trailer 16 hitched to the vehicle 10 while the vehicle 10 performs a forward (or rearward) driving maneuver while towing the trailer 16. The trailer beam length 26 may be measured as the length longitudinally along the trailer 16 from the coupler 14 to a rear axle 28 of the trailer 16. The system may use the estimated trailer beam length 26 for various trailering advanced driver-assistance systems (ADAS).

For example, the trailer beam length 26 is involved in many computations related to ADAS trailering features such as auto-straight-reverse and auto-park features. However, because a vehicle may be used to tow different trailers at different times and each of the different trailers may have different characteristics such as different trailer beam lengths, a trailer beam length for a particular trailer cannot always be predetermined. Asking the operator to measure and input the trailer beam length is not convenient or even always possible, as the driver may be unaware of the beam length of the trailer. Thus, the trailer maneuvering guidance system 12 estimates trailer beam length 26 for the trailer 16 being towed by the vehicle 10 using kinematic vehicle data and by employing the proper vehicle-trailer kinematic equations. Optionally, the system 12 may, whenever a new trailer is detected, perform a calibration process. For example, the system 12 may prompt the vehicle driver to begin the calibration process or, responsive to detecting the new or differently oriented trailer, begin the calibration process. The calibration process includes gathering sufficient kinematic data (e.g., while the vehicle and trailer are driven along a road) in order to perform the required computations to estimate the trailer beam length.

Figure 3:
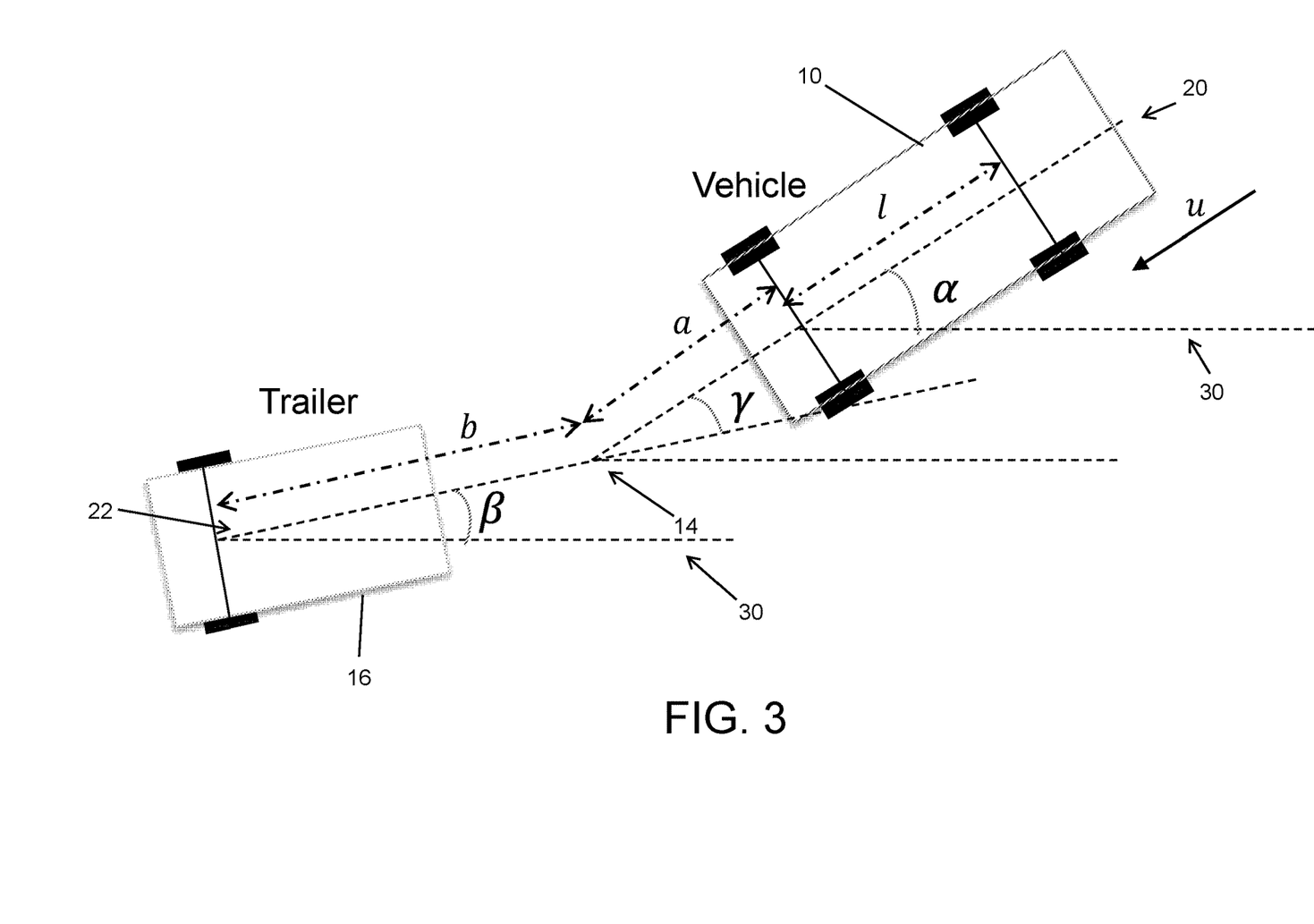
FIG. 3 is a schematic view of a vehicle and trailer with kinematic variables.

Referring now to FIG. 3, vehicle and trailer kinematic equations used to determine or estimate the trailer beam length 26 may be established with parameters or calibration parameters or signal values, such as γ representing the relative angle between the vehicle centerline 20 and the trailer centerline 22. As shown in FIG. 3, α represents an angle between the vehicle centerline 20 and a common axis 30 and β represents an angle between the trailer centerline 22 and the common axis 30 and γ represents the angle between the vehicle centerline 20 and the trailer centerline 22 (i.e., γ=α-β). The vehicle wheelbase (i.e., the length between the front and rear axles of the vehicle) is represented as 1, the hitch length (i.e., the length from the rear axle of the vehicle to the hitch 14 or hitch ball) is represented as a, and the trailer beam length is b. The vehicle speed is represented by u. With these parameters, the trailer relative angle rate of change γ(t) may be determined with the following Equation (1):

$$\dot{\gamma}(t) = u(t)\left(\frac{1}{L}\tan\phi(t) + \frac{1}{b}\frac{a}{L}\tan\phi(t)\cos\gamma(t) - \frac{1}{b}\sin\gamma(t)\right) \quad (1)$$

Figure 4:
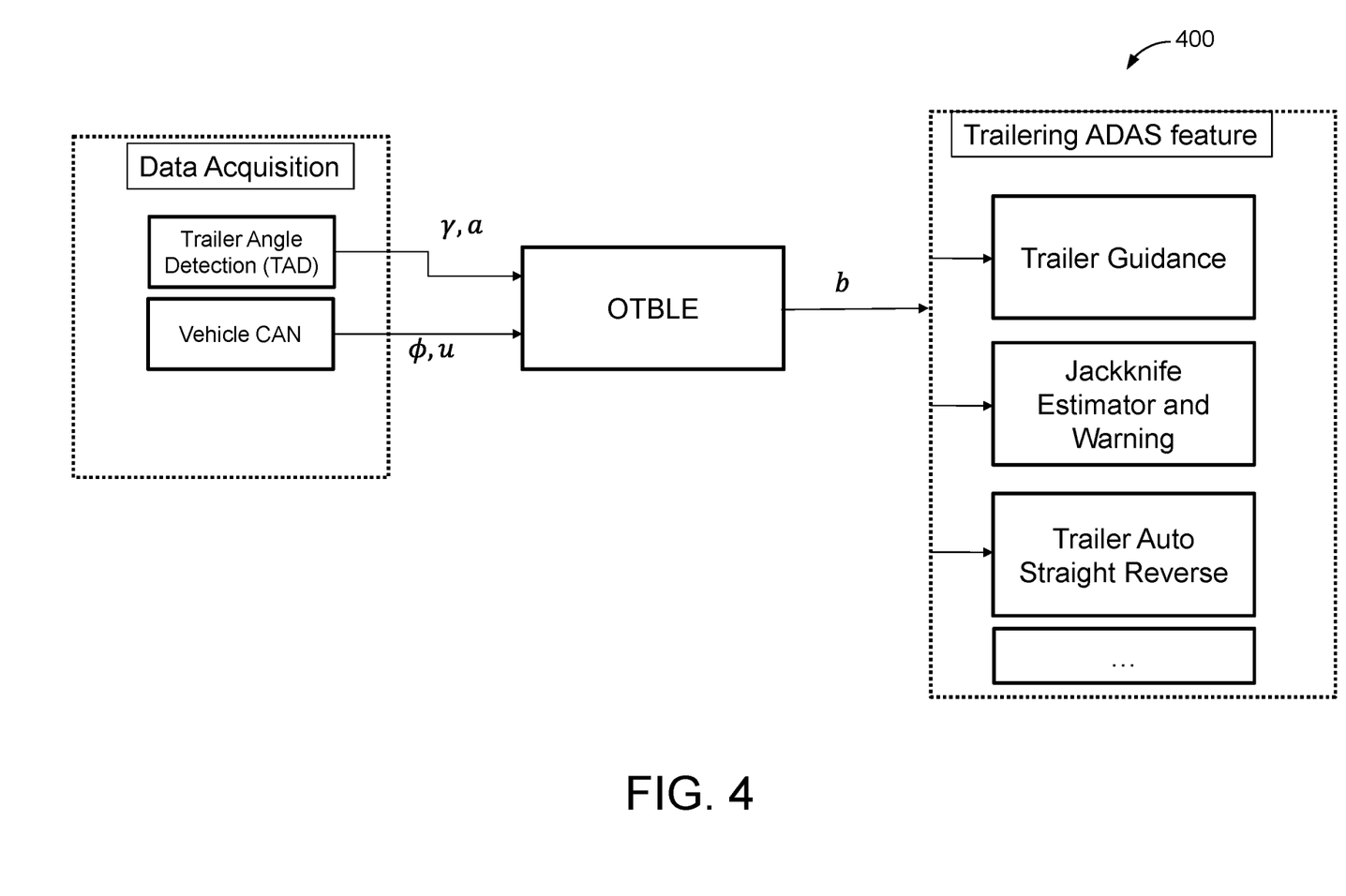
FIG. 4 is a block diagram for an online trailer beam length estimation system.

Referring now to FIG. 4, an online trailer beam length estimation (OTBLE) system is illustrated in block diagram 400. The OBTLE system captures and/or receives the required signal values and determines or estimates the trailer beam length for use by one or more driving assist systems of the vehicle. The OBTLE system may comprise a processor and/or software at the ECU 19 of the vehicle 10, or the system may be remote from the vehicle and in communication with the ECU 19 of the vehicle, such as via wireless communication networks. The OBTLE system receives the required signal values during vehicle operation, such as while the vehicle is performing a driving maneuver with the trailer attached at the trailer hitch. For example, the OBTLE may receive signal values during normal operation of the vehicle or the driving maneuver may comprise a calibration maneuver. Through the driving or calibration maneuver, the OTBLE system receives the required signals values in real-time and the OTBLE system performs the computations to estimate the beam length. The OBTLE system may perform the computations to determine or estimate the beam length during the driving maneuver or may perform the computations at the end of the maneuver. The system may evaluate the estimate and reiterate the estimation process through the use of recorded data to achieve the required accuracy of estimation. In other words, the OBTLE system may record the signal values during the driving or calibration maneuver and perform a plurality of iterations of the computations to improve the accuracy of the determination of beam length. The system may determine the relative angle between the vehicle centerline 20 and the trailer centerline 22 in any suitable fashion, such as by utilizing aspects of the trailer angle detection system described in U.S. patent application Ser. No. 17/443,258, filed Jul. 23, 2021, now U.S. Pat. No. 11,861,878, which is hereby incorporated herein by reference in its entirety.

Figure 5:
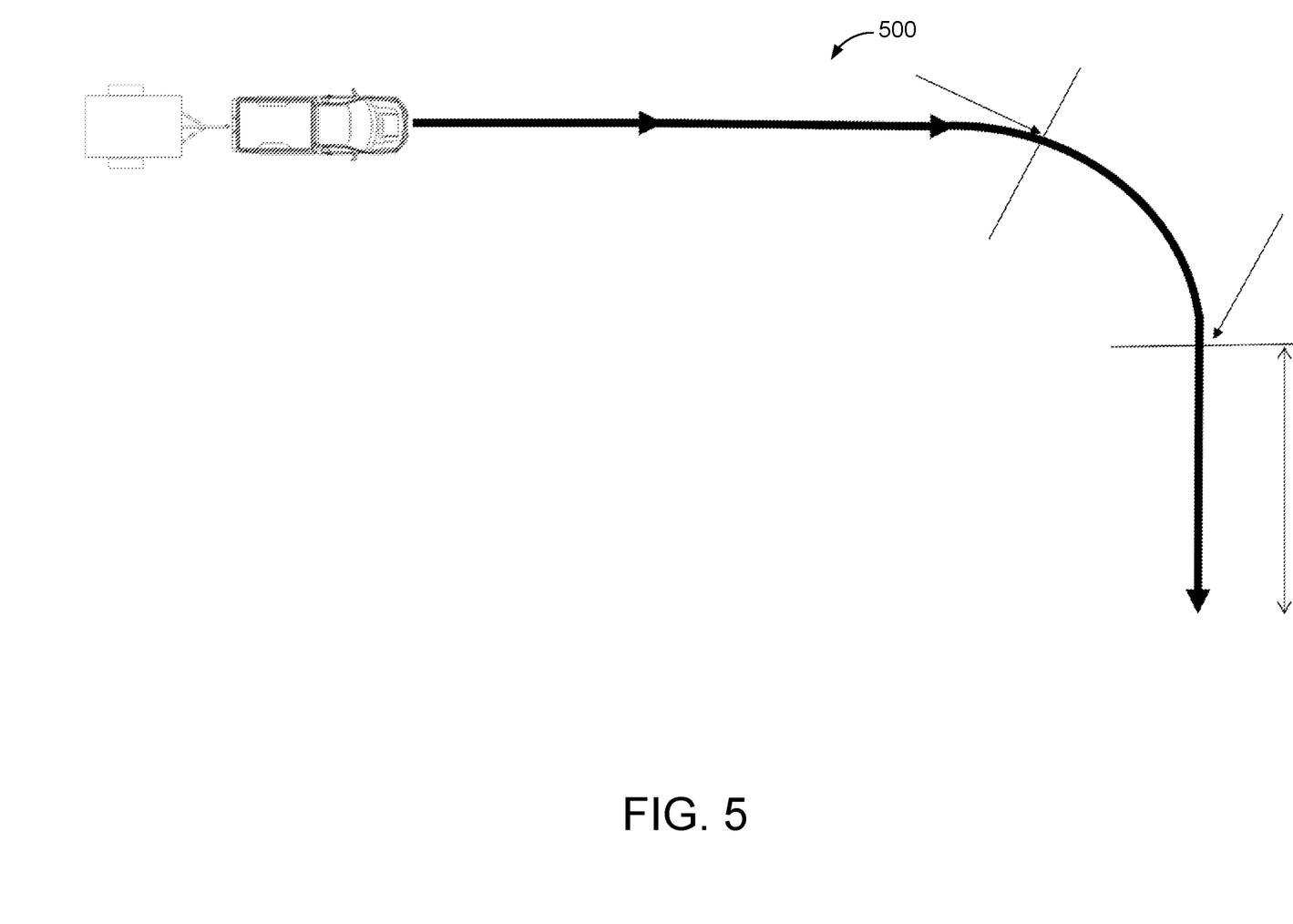
FIG. 5 is a schematic view of a calibration maneuver for the online trailer beam length estimation system.

Referring now to FIG. 5, the OTBLE system performs a calibration maneuver 500 to gather sufficient kinematic information to accurately estimate the trailer beam length. In other words, the system may prompt the driver of the vehicle to perform the calibration maneuver and/or the system may autonomously or semi-autonomously guide the vehicle in performing the calibration maneuver. The OTBLE system, during the calibration maneuver (such as a forward driving maneuver that includes a turn, such as approximately a 90 degree turn, as shown in FIG. 5), collects information related to the relative angle between the vehicle and the trailer (i.e., γ=α-β) and the steering angle or front wheel angle of the towing vehicle. The OTBLE system may also track the vehicle speed as the vehicle (towing the trailer) performs the calibration maneuver. The OTBLE system obtains the towing vehicle's wheelbase (i.e., l) from, for example, vehicle configuration data stored in memory at the vehicle. The OTBLE system may also obtain a hitch length (i.e., a) from, for example, a trailer angle detection (TAD) system. The OBTLE system may obtain the values for the wheelbase of the vehicle and the hitch length before, after, or during the calibration maneuver.

An exemplary calibration maneuver (e.g., as illustrated in FIG. 5) begins with the vehicle (towing the trailer) driving forward in a straight line. The vehicle then begins a turn to the left or the right. The OTBLE system may begin collecting data when γ (i.e., the trailer angle relative to the vehicle) is greater than, for example, ten degrees. The towing vehicle may complete the turn (e.g., a 90 degree turn) by again driving in a straight line. The OTBLE system completes data collection for the calibration maneuver when the trailer is re-aligned with the towing vehicle (e.g., |γ|<1 degree or less than 2 degrees or less than 5 degrees). While the vehicle completes the calibration maneuver, the OTBLE system begins computation after the TAD system completes hitch ball detection. The TAD system may utilize aspects of the trailer angle detection system described in U.S. patent application Ser. No. 17/443,257, filed Jul. 23, 2021, now U.S. Pat. No. 11,702,017 which is hereby incorporated herein by reference in its entirety.

To determine or estimate the trailer beam length, the OTBLE completes a series of computations. By rearranging the kinematic equation (i.e., Equation (1)) to move the unknown parameter (b) to the right provides Equation (2):

$$\left(u\frac{a}{L}\tan\phi\cos\gamma - u\sin\gamma\right) = b\left(\dot{\gamma} - \frac{u}{L}\tan\phi\right) \quad (2)$$

Integrating both sides of Equation (2) provides Equation (3):

$$\left(\int u\frac{a}{L}\tan\phi\cos\gamma - \int u\sin\gamma\right) = b\left(\gamma - \gamma_0 - \int \frac{u}{L}\tan\phi\right) \quad (3)$$

Equation (3) may be provided in the alternate and more compact form of Equation (4):

$$z(t)=b\Phi(t) \quad (4)$$

Equation (4) may be expanded by Equations (5) and (6):

$$z(t) = u\left(\int \frac{a}{L}\tan\phi\cos\gamma - \int \sin\gamma\right) \quad (5)$$

$$\Phi(t) = \left(\gamma - \gamma_0 - \int \frac{u}{L}\tan\phi\right) \quad (6)$$

Equation (4) defines the parametric model of the system. Thus, z(t) is the parametric model and is computed based on the vehicle speed, steering angle, and trailer angle relative to the vehicle. An estimation model may be the same as the parametric model, but instead of computing z based on the vehicle speed, steering angle, and trailer angle relative to the vehicle, z is computed based on the estimated value of beam length (b) and $\Phi$ as shown in Equation (7):

$$\hat{z}=\hat{b}(t)\Phi \quad (7)$$

The difference between the output of the parametric model z and the output of the estimation model $\hat{z}$ is the estimation error, shown in Equation (8):

$$\in = z(t)-\hat{z}(t) \quad (8)$$

The OTBLE system uses the adaptive law to update the beam length estimate based on the estimation error, shown in Equation (9):

$$\dot{b}(t)=\Gamma\in(t) \quad (9)$$

In Equation (9), $\Gamma$ is the adaptive gain. By iterating through the above computation in each sample time, the trailer beam length is updated continuously until the estimation error converges at zero. At that time, the estimated trailer beam length converges at its actual ground-truth value.

Thus, the system includes aspects for an online estimation of a trailer beam length. The system, when a new trailer is hitched to the towing vehicle, performs a calibration maneuver. During the calibration maneuver, the system collects kinematic data regarding the vehicle and the trailer, such as based on captured image data processed by a processor of the system. Based on the collected kinematic data, the system estimates the beam length of the trailer.

The system may utilize aspects of the trailering systems or trailer angle detection systems or trailer hitch systems described in U.S. Pat. Nos. 10,755,110; 10,638,025; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873 and/or US-2017-0217372, and/or U.S. patent application Ser. No. 17/443,258, filed Jul. 23, 2021, now U.S. Pat. No. 11,861,878, Ser. No. 17/443,257, filed Jul. 23, 2021, now U.S. Pat. No. 11,702,017, and/or Ser. No. 17/443,256, filed Jul. 23, 2021, now U.S. Pat. No. 11,875,575, and/or International Publication No. WO 2021/0127693, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460;

6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer beam estimation system, the vehicular trailer beam estimation system comprising:
   a camera disposed at a rear portion of a vehicle equipped with the vehicular trailer beam estimation system;
   wherein the camera comprises a CMOS imaging array, and wherein the CMOS imaging array comprises at least one million photosensors arranged in rows and columns;
   wherein the camera views at least rearward of the vehicle, the camera capturing image data;
   wherein the vehicle is equipped with a trailer hitch and, with a trailer hitched at the trailer hitch of the vehicle, the camera views at least a portion of the trailer hitched at the trailer hitch of the vehicle;
   an electronic control unit (ECU) comprising electronic circuitry and associated software, the electronic circuitry comprising an image processor operable to process image data captured by the camera;
   wherein the vehicular trailer beam estimation system, responsive at least in part to processing by the image processor of image data captured by the camera, determines a trailer angle, the trailer angle comprising an angle between a longitudinal axis of the trailer and a longitudinal axis of the vehicle;
   wherein, during a driving maneuver of the vehicle, the vehicular trailer beam estimation system tracks trailering parameters comprising at least (i) the determined trailer angle, (ii) steering angle of the vehicle and (iii) speed of the vehicle; and
   wherein the vehicular trailer beam estimation system determines beam length of the trailer based at least in part on (i) the trailering parameters tracked during the driving maneuver, (ii) the vehicle's wheelbase and (iii) hitch length of the trailer hitch of the vehicle, the hitch length comprising distance along the longitudinal axis of the vehicle from a rear axle of the vehicle to a hitch ball of the trailer hitch of the vehicle.

2. The vehicular trailer beam estimation system of claim 1, wherein the driving maneuver comprises (i) a first portion where the vehicle drives in a first straight line, (ii) a second portion following the first portion where the vehicle performs a turn and (iii) a third portion following the second portion where the vehicle drives in a second straight line.

3. The vehicular trailer beam estimation system of claim 2, wherein, during the second portion of the driving maneuver, the vehicle performs a 90 degree turn.

4. The vehicular trailer beam estimation system of claim 1, wherein the vehicular trailer beam estimation system determines the beam length of the trailer based on one or more vehicle-trailer kinematic equations.

5. The vehicular trailer beam estimation system of claim 4, wherein the vehicular trailer beam estimation system determines the beam length of the trailer by iterating the one or more vehicle-trailer kinematic equations until an error estimate converges to zero.

6. The vehicular trailer beam estimation system of claim 1, wherein the vehicular trailer beam estimation system determines the beam length of the trailer based on an estimation error and an adaptive gain.

7. The vehicular trailer beam estimation system of claim 1, wherein, during the driving maneuver, the vehicular trailer beam estimation system begins tracking the trailering parameters responsive to determination that the determined trailer angle is greater than a threshold angle.

8. The vehicular trailer beam estimation system of claim 7, wherein the threshold angle is at least 10 degrees.

9. The vehicular trailer beam estimation system of claim 7, wherein, during the driving maneuver, the vehicular trailer beam estimation system stops tracking the trailering parameters responsive to determination that the determined trailer angle is below a second threshold angle.

10. The vehicular trailer beam estimation system of claim 9, wherein the second threshold angle is less than 2 degrees.

11. The vehicular trailer beam estimation system of claim 1, wherein the vehicular trailer beam estimation system, during the driving maneuver, records the trailering parameters to refine the determined beam length of the trailer after the driving maneuver is complete.

12. The vehicular trailer beam estimation system of claim 1, wherein the driving maneuver comprises a calibration maneuver, and wherein the vehicular trailer beam estimation system prompts a driver of the vehicle to perform the calibration maneuver.

13. The vehicular trailer beam estimation system of claim 1, wherein the vehicular trailer beam estimation system determines the beam length of the trailer after the driving maneuver is complete.

14. The vehicular trailer beam estimation system of claim 1, wherein the vehicular trailer beam estimation system provides the determined beam length of the trailer to a trailering assist system of the vehicle.

15. The vehicular trailer beam estimation system of claim 1, wherein the camera comprises a rear backup camera of the vehicle.

16. A vehicular trailer beam estimation system, the vehicular trailer beam estimation system comprising:
   a camera disposed at a rear portion of a vehicle equipped with the vehicular trailer beam estimation system;
   wherein the camera comprises a CMOS imaging array, and wherein the CMOS imaging array comprises at least one million photosensors arranged in rows and columns;
   wherein the camera views at least rearward of the vehicle, the camera capturing image data;
   wherein the vehicle is equipped with a trailer hitch and, with a trailer hitched at the trailer hitch of the vehicle, the camera views at least a portion of the trailer hitched at the trailer hitch of the vehicle;
   an electronic control unit (ECU) comprising electronic circuitry and associated software, the electronic circuitry comprising an image processor operable to process image data captured by the camera;
   wherein the vehicular trailer beam estimation system, responsive at least in part to processing by the image processor of image data captured by the camera, determines a trailer angle, the trailer angle comprising an angle between a longitudinal axis of the trailer and a longitudinal axis of the vehicle;
   wherein, during a forward driving maneuver of the vehicle that includes a turning maneuver of the vehicle, and responsive to determining that the determined trailer angle is greater than a threshold angle, the vehicular trailer beam estimation system tracks trailering parameters comprising at least (i) the determined trailer angle, (ii) steering angle of the vehicle and (iii) speed of the vehicle; and wherein the vehicular trailer beam estimation system determines beam length of the trailer based at least in part on (i) the trailering parameters tracked during the forward driving maneuver, (ii) the vehicle's wheelbase and (iii) hitch length of the trailer hitch of the vehicle, the hitch length comprising distance along the longitudinal axis of the vehicle from a rear axle of the vehicle to a hitch ball of the trailer hitch of the vehicle.

17. The vehicular trailer beam estimation system of claim 16, wherein the turn comprises a 90 degree turn.

18. The vehicular trailer beam estimation system of claim 17, wherein the vehicular trailer beam estimation system determines the beam length of the trailer based on one or more vehicle-trailer kinematic equations.

19. The vehicular trailer beam estimation system of claim 16, wherein the vehicular trailer beam estimation system determines the beam length of the trailer by iterating the one or more vehicle-trailer kinematic equations until an error estimate converges to zero.

20. A vehicular trailer beam estimation system, the vehicular trailer beam estimation system comprising:

a rear backup camera disposed at a rear portion of a vehicle equipped with the vehicular trailer beam estimation system;

wherein the rear backup camera comprises a CMOS imaging array, and wherein the CMOS imaging array comprises at least one million photosensors arranged in rows and columns;

wherein the rear backup camera views at least rearward of the vehicle, the rear backup camera capturing image data;

wherein the vehicle is equipped with a trailer hitch and, with a trailer hitched at the trailer hitch of the vehicle, the rear backup camera views at least a portion of the trailer hitched at the trailer hitch of the vehicle;

an electronic control unit (ECU) comprising electronic circuitry and associated software, the electronic circuitry comprising an image processor operable to process image data captured by the rear backup camera;

wherein the vehicular trailer beam estimation system, responsive at least in part to processing by the image processor of image data captured by the rear backup camera, determines a trailer angle, the trailer angle comprising an angle between a longitudinal axis of the trailer and a longitudinal axis of the vehicle;

wherein, during a forward driving maneuver of the vehicle, the vehicular trailer beam estimation system tracks trailering parameters comprising at least (i) the determined trailer angle, (ii) steering angle of the vehicle and (iii) speed of the vehicle; and wherein the vehicular trailer beam estimation system determines beam length of the trailer based at least in part on (i) the trailering parameters tracked during the forward driving maneuver, (ii) the vehicle's wheelbase, (iii) hitch length of the trailer hitch of the vehicle and (iv) one or more vehicle-trailer kinematic equations, the hitch length comprising distance along the longitudinal axis of the vehicle from a rear axle of the vehicle to a hitch ball of the trailer hitch of the vehicle.

21. The vehicular trailer beam estimation system of claim 20, wherein the forward driving maneuver comprises (i) a first portion where the vehicle drives in a first straight line, (ii) a second portion following the first portion where the vehicle performs a turn and (iii) a third portion following the second portion where the vehicle drives in a second straight line.

22. The vehicular trailer beam estimation system of claim 20, wherein the vehicular trailer beam estimation system determines the beam length of the trailer by iterating the one or more vehicle-trailer kinematic equations until an error estimate converges to zero.

\* \* \* \* \*

UNITED STATES PATENT AND TRADEMARK OFFICE
CERTIFICATE OF CORRECTION

PATENT NO. : 11,989,902 B2
APPLICATION NO. : 17/643596
DATED : May 21, 2024
INVENTOR(S) : Mohammadmehdi Jalalmaab et al.

It is certified that error appears in the above-identified patent and that said Letters Patent is hereby corrected as shown below:

In the Specification

Column 3
Lines 42-43, "represented as 1," should be --represented as $l$,--

Column 4
Line 39, "wheelbase (i.e., 1) from," should be --wheelbase (i.e., $l$) from,--

Signed and Sealed this
Eighteenth Day of June, 2024

Katherine Kelly Vidal
*Director of the United States Patent and Trademark Office*